(12) United States Patent
Ito et al.

(10) Patent No.: US 7,713,680 B2
(45) Date of Patent: May 11, 2010

(54) RADIATION SENSITIVE RESIN COMPOSITION FOR FORMING A PROTECTIVE FILM, METHOD OF FORMING A PROTECTIVE FILM FROM THE COMPOSITION, LIQUID CRYSTAL DISPLAY DEVICE AND SOLID-STATE IMAGE SENSING DEVICE

(75) Inventors: Yukiko Ito, Chuo-ku (JP); Daigo Ichinohe, Chuo-ku (JP); Toru Kajita, Chuo-ku (JP)

(73) Assignee: JSR Corporation, Tokyo (JP)

( * ) Notice: Subject to any disclaimer, the term of this patent is extended or adjusted under 35 U.S.C. 154(b) by 225 days.

(21) Appl. No.: 12/051,037

(22) Filed: Mar. 19, 2008

(65) Prior Publication Data
US 2008/0233515 A1    Sep. 25, 2008

(30) Foreign Application Priority Data
Mar. 20, 2007    (JP) .............................. 2007-072586

(51) Int. Cl.
G03F 7/00    (2006.01)
G03F 7/033   (2006.01)
G03F 7/40    (2006.01)

(52) U.S. Cl. .................. 430/280.1; 430/18; 430/311

(58) Field of Classification Search ............ None
See application file for complete search history.

(56) References Cited

U.S. PATENT DOCUMENTS

| | | | | |
|---|---|---|---|---|
| 6,013,415 A | * | 1/2000 | Sakurai et al. | 430/281.1 |
| 6,255,034 B1 | * | 7/2001 | Shimada et al. | 430/281.1 |
| 2003/0036018 A1 | * | 2/2003 | Li | 430/280.1 |

FOREIGN PATENT DOCUMENTS

| | | |
|---|---|---|
| EP | 0 897 938 A2 | 2/1999 |
| JP | 05-078453 | 3/1993 |
| JP | 06-192389 | 7/1994 |
| JP | 6-256684 | 9/1994 |
| JP | 11-149010 | 6/1999 |
| JP | 2001-091732 | 4/2001 |
| JP | 2001-164072 | 6/2001 |
| JP | 2001-302870 | 10/2001 |
| JP | 2003-96149 | 4/2003 |
| JP | 2005-248129 | 9/2005 |
| JP | 2006-199902 | 8/2006 |

OTHER PUBLICATIONS

"Curable resin composition for forming protective film, contains polymer having two or more epoxy groups, and organic solvent containing ether compound", JSR corporation, Derwent publication, AN 2006-256679, XP002480134, JP 2006-83248, Mar. 30, 2006, pp. 1-3.

U.S. Appl. No. 09/416,951, filed Oct. 13, 1999, Iijima, et al.

* cited by examiner

*Primary Examiner*—Cynthia Hamilton
(74) *Attorney, Agent, or Firm*—Oblon, Spivak, McClelland, Maier & Neustadt, L.L.P.

(57) ABSTRACT

A radiation sensitive resin composition for forming a protective film, comprising:

[A] a copolymer of (a1) an unsaturated carboxylic acid and/or an unsaturated carboxylic anhydride, (a2) an epoxy group-containing unsaturated compound and (a3) an unsaturated compound different from the components (a1) and (a2);

[B] a monofunctional polymerizable unsaturated compound having a molecular weight of 180 or more and a carboxyl group;

[C] a polyfunctional polymerizable unsaturated compound; and

[D] a photopolymerization initiator, a method of forming a protective film from the above composition and a protective film formed from the above composition.

The composition can provide a cured film having high flatness, has high developability and heat resistance, is advantageously used to form a protective film for liquid crystal display devices and solid-state image sensing devices, and has high storage stability as a composition.

6 Claims, No Drawings

RADIATION SENSITIVE RESIN COMPOSITION FOR FORMING A PROTECTIVE FILM, METHOD OF FORMING A PROTECTIVE FILM FROM THE COMPOSITION, LIQUID CRYSTAL DISPLAY DEVICE AND SOLID-STATE IMAGE SENSING DEVICE

FIELD OF THE INVENTION

The present invention relates to a radiation sensitive resin composition for forming a protective film, a method of forming a protective film from the composition, and a protective film. More specifically, it relates to a composition suitable for use as a material for forming a protective film for use in color filters for liquid crystal display devices (LCD) and color filters for solid-state image sensing devices such as charge-coupled devices (CCD), a method of forming a protective film from the composition, and a protective film formed from the composition.

DESCRIPTION OF THE PRIOR ART

In the process of manufacturing a radiation device such as LCD or CCD, a display device is immersed in a solvent or an acid or alkali solution and the surface of the device is locally exposed to a high temperature when a wired electrode layer is formed by sputtering. Therefore, to prevent the deterioration or damage of the device by these treatments, a protective film composed of a thin film having resistance to these treatments is formed on the surface of the device.

It is desired that the protective film should have high adhesion to a substrate or an underlying layer on which the protective film is to be formed and a layer to be formed on the protective film, be smooth and tough itself, have transparency and high heat hesitance and light resistance, be free from deterioration such as coloring, yellowing or whitening for a long time and be excellent in water resistance, solvent resistance, acid resistance and alkali resistance.

As a material for forming the protective film which satisfies the above requirements, there is known, for example, a thermosetting composition containing a polymer having a glycidyl group (refer to JP-A 5-78453 and JP-A 2001-91732).

When this protective film is used as a protective film for the color filter of a color liquid crystal display or a charge-coupled device, in general, the film needs to be able to flatten a level difference made by a color filter formed on an underlying substrate.

Further, in a color liquid crystal display device, for example, an STN (Super Twisted Nematic) or TFT (Thin Film Transistor) color liquid crystal display device, panels are joined together after bead-like spacers are scattered over the protective film to keep the cell gap of a liquid crystal layer uniform. A liquid crystal cell is then sealed up by the thermal compression bonding of a sealing material. The protective film in a portion where the beads are existent is curved by heat and pressure applied at that time, thereby making the cell gap nonuniform.

Particularly in the case of the manufacture of an STN color liquid crystal display device, the assembly of a color filter and a substrate must be carried out with high accuracy, and the protective film must have extremely high level difference flattening ability and resistance to heat and pressure.

According to the structure of the device, the patterning of the protective film is required and therefore, the use of a thermosetting composition may be difficult. In this case, a radiation sensitive composition is used (refer to Japanese Patent No. 3151975).

Since a radiation sensitive resin composition for forming a protective film which exhibits the above properties has a thermally crosslinkable group to form a firm crosslink, it has low storage stability at a temperature around room temperature and is not easy to handle.

Then, a radiation sensitive resin composition for forming a protective film, which is excellent in storage stability as well as flatness, developability and heat resistance has been desired.

SUMMARY OF THE INVENTION

It is an object of the present invention which has been made in the above situation to provide a composition which can provide a cured film having high flatness, is advantageously used to form a protective film for liquid crystal display devices and solid-state image sensing devices, and has excellent developability and heat resistance as well as excellent storage stability as a composition, a method of forming a protective film from the above composition, and a protective film formed from the above composition.

Other objects and advantages of the present invention will become apparent from the following description.

According to the present invention, firstly, the above objects and advantages of the present invention are attained by a radiation sensitive resin composition for forming a protective film, comprising:

[A] a copolymer of (a1) an unsaturated carboxylic acid an unsaturated carboxylic anhydride or a mixture of an unsaturated carboxylic acid and an unsaturated carboxylic anhydride, (a2) an epoxy group-containing unsaturated compound and (a3) another unsaturated compound different from the above components (a1) and (a2),

[B] a monofunctional polymerizable unsaturated compound having a carboxyl group and a molecular weight of 180 or more,

[C] a polyfunctional polymerizable unsaturated compound, and

[D] a photopolymerization initiator, preferably a radiation sensitive resin composition for forming a protective film, wherein (a3) of the copolymer [A] comprises a polymerizable unsaturated compound having at least one structure selected from the group consisting of the acetal ester structure of carboxylic acid, the ketal ester structure of carboxylic acid, the t-butyl ester structure of carboxylic acid and the 1-alkyl-cycloalkyl ester structure of carboxylic acid.

Secondly, the above objects and advantages of the present invention are attained by a method of forming a protective film for liquid crystal display devices or solid-state image sensing devices, comprising at least the following steps in the following mentioned order:

(1) forming a coating film of the above radiation sensitive resin composition for forming a protective film on a substrate;

(2) exposing at least part of the coating film to radiation;

(3) developing the coating film after exposure; and (4) heating the coating film after development.

Thirdly, the above objects and advantages of the present invention are attained by a protective film for liquid crystal display devices or solid-state image sensing devices which is formed by the above method.

In the fourth place, the above objects and advantages of the present invention are attained by a liquid crystal display device or solid-state image sensing device having the above protective film.

DETAILED DESCRIPTION OF THE PREFERRED EMBODIMENTS

Each of the components of the radiation sensitive resin composition for forming a protective film of the present invention (to be referred to as "radiation sensitive resin composition" hereinafter) will be described in detail hereinunder.

[A] Copolymer

The component [A] in the radiation sensitive resin composition of the present invention is a copolymer (to be referred to as "copolymer [A]" hereinafter) of (a1) an unsaturated carboxylic acid and/or an unsaturated carboxylic anhydride (to be collectively referred to as "compound (a1)" hereinafter), (a2) an epoxy group-containing unsaturated compound (to be referred to as "compound (a2)" hereinafter), and (a3) another unsaturated compound (to be referred to as "compound (a3)" hereinafter).

The copolymer [A] in the present invention contributes to the curing reaction of an exposed portion and serves to develop the solubility in an alkali developer used in the step of developing a coating film of an unexposed portion of the composition of the present invention.

Examples of the compound (a1) include monocarboxylic acids such as acrylic acid, methacrylic acid and crotonic acid; dicarboxylic acids such as maleic acid, fumaric acid, citraconic acid, mesaconic acid and itaconic acid; and anhydrides of these dicarboxylic acids.

Out of these compounds (a1), acrylic acid, methacrylic acid and maleic anhydride are preferred from the viewpoint of copolymerization reactivity and easy acquisition.

The above compounds (a1) may be used alone or in combination of two or more.

In the copolymer [A], the content of a structural unit derived from the compound (a1) is preferably 5 to 50 wt %, more preferably 10 to 40 wt % [with the proviso that (a1)+(a2)+(a3)=100 wt %, the same shall apply hereinafter]. When the content of the above structural unit is lower than 5 wt %, the developability of the obtained protective film may lower and when the content is higher than 50 wt %, the storage stability of the radiation sensitive resin composition may degrade.

Examples of the compound (a2) include carboxylates such as glycidyl acrylate, glycidyl methacrylate, glycidyl α-ethylacrylate, glycidyl α-n-propylacrylate, glycidyl α-n-butylacrylate, 3,4-epoxybutyl acrylate, 3,4-epoxybutyl methacrylate, 3,4-epoxybutyl α-ethylacrylate, 6,7-epoxyheptyl acrylate, 6,7-epoxyheptyl methacrylate, 6,7-epoxyheptyl α-ethylacrylate, β-methylglycidyl acrylate, β-methylglycidyl methacrylate, β-ethylglycidyl acrylate, β-ethylglycidyl methacrylate, β-n-propylglycidyl acrylate, β-n-propylglycidyl methacrylate, 3,4-epoxycyclohexyl acrylate and 3,4-epoxycyclohexyl methacrylate; and ether compounds such as o-vinylbenzylglycidyl ether, m-vinylbenzylglycidyl ether and p-vinylbenzylglycidyl ether.

Out of these compounds (a2), glycidyl methacrylate, 6,7-epoxyheptyl methacrylate, 3,4-epoxycyclohexyl methacrylate, β-methylglycidyl methacrylate, o-vinylbenzylglycidyl ether, m-vinylbenzylglycidyl ether and p-vinylbenzylglycidyl ether are preferred because they improve copolymerization reactivity and the strength of the obtained protective film.

The above compounds (a2) may be used alone or in combination of two or more.

In the copolymer [A], the content of a structural unit derived from the compound (a2) is preferably 10 to 70 wt %, particularly preferably 20 to 60 wt %. When the content of the above structural unit is lower than 10 wt %, the heat resistance and chemical resistance of the obtained protective film may lower and when the content is higher than 70 wt %, the storage stability of the radiation sensitive resin composition may degrade.

In the present invention, preferred examples of the compound (a3) include polymerizable unsaturated compounds (to be collectively referred to as "compound (a3-1)" hereinafter) having at least one structure selected from the group consisting of the acetal ester structure of carboxylic acid, the ketal ester structure of carboxylic acid, the t-butyl ester structure of carboxylic acid and the 1-alkylcycloalkyl ester structure of carboxylic acid.

Out of the compounds (a3-1), examples of the polymerizable unsaturated compounds having the acetal ester structure of carboxylic acid or the ketal ester structure of carboxylic acid include norbornene compounds having the acetal ester structure of carboxylic acid or the ketal ester structure of carboxylic acid, and (meth)acrylate compounds having the acetal or ketal ester structure of carboxylic acid.

The above norbornene compounds having the acetal ester structure of carboxylic acid or the ketal ester structure include 2,3-di-tetrahydropyran-2-yloxycarbonyl-5-norbornene, 2,3-di-trimethylsilanyloxycarbonyl-5-norbornene, 2,3-di-triethylsilanyloxycarbonyl-5-norbornene, 2,3-di-t-butyldimethylsilanyloxycarbonyl-5-norbornene, 2,3-di-trimethylgermyloxycarbonyl-5-norbornene, 2,3-di-triethylgermyloxycarbonyl-5-norbornene, 2,3-di-t-butyldimethylgermyloxycarbonyl-5-norbornene, 2,3-di-t-butyloxycarbonyl-5-norbornene, 2,3-di-benzyloxycarbonyl-5-norbornene, 2,3-di-tetrahydrofuran-2-yloxycarbonyl-5-norbornene, 2,3-di-tetrahydropyran-2-yloxycarbonyl-5-norbornene, 2,3-di-cyclobutyloxycarbonyl-5-norbornene, 2,3-di-cyclopentyloxycarbonyl-5-norbornene, 2,3-di-cyclohexyloxycarbonyl-5-norbornene, 2,3-di-cycloheptyloxycarbonyl-5-norbornene, 2,3-di-1-methoxyethoxycarbonyl-5-norbornene, 2,3-di-1-t-butoxyethoxycarbonyl-5-norbornene, 2,3-di-1-benzyloxyethoxycarbonyl-5-norbornene, 2,3-di-(cyclohexyl)(ethoxy)methoxycarbonyl-5-norbornene, 2,3-di-1-methyl-1-methoxyethoxycarbonyl-5-norbornene, 2,3-di-1-methyl-1-i-butoxyethoxycarbonyl-5-norbornene and 2,3-di-(benzyl)(ethoxy)methoxycarbonyl-5-norbornene.

The above (meth)acrylate compounds having the acetal ester or ketal ester structure include 1-ethoxyethyl(meth)acrylate, tetrahydro-2H-pyran-2-yl (meth)acrylate, 1-(cyclohexyloxy)ethyl(meth)acrylate, 1-(2-methylpropoxy)ethyl (meth)acrylate, 1-(1,1-dimethyl-ethoxy)ethyl(meth)acrylate and 1-(cyclohexyloxy)ethyl(meth)acrylate.

Out of the compounds (a3-1), examples of the polymerizable unsaturated compounds having the t-butyl ester structure of carboxylic acid include t-butyl (meth)acrylate.

Out of the compounds (a3-1), examples of the polymerizable unsaturated compounds having the 1-alkylcycloalkyl ester structure of carboxylic acid include 1-methylcyclopropane(meth)acrylate, 1-methylcyclobutane(meth)acrylate, 1-methylcyclopentyl(meth)acrylate, 1-methylcyclohexyl (meth)acrylate, 1-methylcycloheptan(meth)acrylate, 1-methylcyclooctane(meth)acrylate, 1-methylcyclononane(meth) acrylate, 1-ethylcyclodecane(meth)acrylate, 1-ethylcyclopropane(meth)acrylate, 1-ethylcyclobutane (meth)acrylate, 1-ethylcyclopentyl(meth)acrylate, 1-ethylcyclohexyl(meth)acrylate, 1-ethylcycloheptane(meth)acrylate, 1-ethylcyclooctane(meth)acrylate, 1-ethylcyclononane(meth)acrylate, 1-ethylcyclodecane(meth)acrylate, 1-(iso)propylcyclopropane(meth)acrylate, 1-(iso)propylcyclobutane(meth)acrylate, 1-(iso)propylcyclopentyl(meth)acrylate, 1-(iso)propylcyclohexyl(meth)acrylate, 1-(iso)propylcycloheptane(meth)acrylate, 1-(iso)propylcyclooctane(meth)acrylate, 1-(iso)propylcyclononane(meth)acrylate, 1-(iso)propylcyclodecane(meth)acrylate, 1-(iso)butylcyclopropane(meth)acrylate, 1-(iso)butylcyclobutane(meth)acrylate, 1-(iso)butylcyclopentyl(meth)acrylate, 1-(iso)butylcyclohexyl(meth)acrylate, 1-(iso)butylcycloheptane(meth)acrylate, 1-(iso)butylcyclooctane(meth)acrylate, 1-(iso)butylcyclononane(meth)acrylate, 1-(iso)butylcyclodecanyl(meth)acrylate, 1-(iso)pentylcyclopropanyl(meth)acrylate, 1-(iso)pentylcyclobutanyl(meth)acrylate, 1-(iso)pentylcyclopentyl(meth)acrylate, 1-(iso)pentylcyclohexyl(meth)acrylate, 1-(iso)pentylcycloheptanyl(meth)acrylate, 1-(iso)pentylcyclooctanyl(meth)acrylate, 1-(iso)pentylcyclononanyl(meth)acrylate, 1-(iso)pentylcyclodecanyl(meth)acrylate, 1-(iso)hexylcyclopropanyl(meth)acrylate, 1-(iso)hexylcyclobutanyl(meth)acrylate, 1-(iso)hexylcyclohexyl(meth)acrylate, 1-(iso)hexylcycloheptanyl(meth)acrylate, 1-(iso)hexylcyclooctanyl(meth)acrylate, 1-(iso)hexylcyclononanyl(meth)acrylate, 1-(iso)hexylcyclodecanyl(meth)acrylate, 1-(iso)heptylcyclopropanyl(meth)acrylate, 1-(iso)heptylcyclobutanyl(meth)acrylate, 1-(iso)heptylcycloheptyl(meth)acrylate, 1-(iso)heptylcycloheptanyl(meth)acrylate, 1-(iso)heptylcyclootanyl(meth)acrylate, 1-(iso)heptylcyclononanyl(meth)acrylate, 1-(iso)heptylcyclodecanyl(meth)acrylate, 1-(iso)octylcyclopropanyl(meth)acrylate, 1-(iso)octylcyclobutanyl(meth)acrylate, 1-(iso)octylcyclooctyl(meth)acrylate, 1-(iso)octylcycloheptanyl(meth)acrylate, 1-(iso)octylcyclooctanyl(meth)acrylate, 1-(iso)octylcyclononanyl(meth)acrylate and 1-(iso)octylcyclodecanyl(meth)acrylate.

Out of the above compounds (a3-1), 1-ethoxyethyl methacrylate, tetrahydro-2H-pyran-2-yl methacrylate, 1-(cyclohexyloxy)ethyl methacrylate, 1-(2-methylpropoxy)ethyl methacrylate, 1-(1,1-dimethyl-ethoxy)ethyl methacrylate, 1-(cyclohexyloxy)ethyl methacrylate, t-butyl methacrylate, 1-diethylpropyl(meth)acrylate, 1-ethylcyclopentyl (meth)acrylate, 1-ethylcyclohexyl(meth)acrylate, 1-(iso)propylcyclopentyl(meth)acrylate, 1-(iso)propylcyclohexyl(meth)acrylate, 1-(iso)butylcyclopentyl(meth)acrylate and 1-(iso)butylcyclohexyl(meth)acrylate are preferred. 1-diethylpropyl(meth)acrylate, 1-ethylcyclopentyl(meth)acrylate and 1-ethylcyclohexyl(meth)acrylate are more preferred, and 1-ethylcyclopentyl(meth)acrylate and 1-ethylcyclohexyl(meth)acrylate are particularly preferred. They are preferably used because they improve copolymerization reactivity, the heat resistance of the obtained protective film and the storage stability of a composition solution.

The above compounds (a3-1) may be used alone or in combination of two or more.

In the copolymer [A], the content of a structural unit derived from the compound (a3-1) is preferably 10 to 80 wt %, particularly preferably 20 to 60 wt %. When the content of the above structural unit is lower than 10 wt %, the storage stability of the radiation sensitive resin composition may lower and when the content is higher than 80 wt %, developability may degrade.

Compounds (a3) (to be collectively referred to as "compound (a3-2)" hereinafter) other than the above compounds (a3-1) include alky acrylates such as methyl acrylate, ethyl acrylate, n-propyl acrylate, i-propyl acrylate, n-butyl acrylate, i-butyl acrylate, sec-butyl acrylate and t-butyl acrylate; alkyl methacrylates such as methyl methacrylate, ethyl methacrylate, n-propyl methacrylate, i-propyl methacrylate, n-butyl methacrylate, i-butyl methacrylate, sec-butyl methacrylate and t-butyl methacrylate; alicyclic acrylates such as cyclohexyl acrylate, 2-methylcyclohexyl acrylate, tricyclo[$5.2.1.0^{2.6}$]decan-8-yl acrylate ("tricyclo[$5.2.1.0^{2.6}$]decan-8-yl acrylate" will be referred to as "dicyclopentanyl" hereinafter), 2-dicyclopentenyloxyethyl acrylate, isobornyl acrylate and tetrahydrofuryl acrylate; alicyclic methacrylates such as cyclohexyl methacrylate, 2-methylcyclohexyl methacrylate, dicyclopentanyl methacrylate, 2-dicyclopentenyloxyethyl methacrylate, isobornyl methacrylate and tetrahydrofuryl methacrylate; aryl acrylates such as phenyl acrylate and benzyl acrylate; aryl methacrylates such as phenyl methacrylate and benzyl methacrylate; dialkyl dicarboxylates such as diethyl maleate, diethyl fumarate and diethyl itaconate; hydroxyalkyl acrylates such as 2-hydroxyethyl acrylate and 2-hydroxypropyl acrylate; hydroxyalkyl methacrylates such as 2-hydroxyethyl methacrylate and 2-hydroxypropyl methacrylate; aromatic vinyl compounds such as styrene, α-methylstyrene, m-methylstyrene, p-methylstyrene and p-methoxystyrene; and acrylonitrile, methacrylonitrile, acrylamide, methacrylamide, vinyl acetate, 1,3-butadiene, isoprene, 2,3-dimethyl-1,3-butadiene, N-cyclohexylmaleimide, N-phenylmaleimide, N-benzylmaleimide, N-succinimidyl-3-maleimide benzoate, N-succinimidyl-4-maleimide butyrate, N-succinimidyl-6-maleimide caproate, N-succinimidyl-3-maleimide propionate and N-(9-acridinyl)maleimide.

Out of these compounds (a3-2), 2-methylcyclohexyl acrylate, t-butyl methacrylate, dicyclopentanyl methacrylate, styrene, p-methoxystyrene, 1,3-butadiene and N-cyclohexylmaleimide are preferred from the viewpoint of copolymerization reactivity.

The above compounds (a3-2) may be used alone or in combination of two or more.

In the copolymer [A], the content of a structural unit derived from the compound (a3-2) is preferably 10 to 80 wt %, particularly preferably 20 to 60 wt %. When the content of the above structural unit is lower than 10 wt %, the storage stability of the radiation sensitive composition may lower and when the content is higher than 80 wt %, developability may degrade.

The copolymer [A] can be manufactured by radically polymerizing the compound (a1), the compound (a2) and the compound (a3) in a solvent in the presence of a polymerization initiator.

Examples of the solvent used for the manufacture of the copolymer [A] include alcohols such as methanol and ethanol; ethers such as tetrahydrofuran; ethylene glycol ethers such as ethylene glycol monomethyl ether and ethylene glycol monoethyl ether; ethylene glycol alkyl ether acetates such as ethylene glycol methyl ether acetate and ethylene glycol ethyl ether acetate; diethylene glycol alkyl ethers such as diethylene glycol monomethyl ether, diethylene glycol monoethyl ether, diethylene glycol dimethyl ether, diethylene glycol diethyl ether and diethylene glycol methyl ethyl ether; propylene glycol ethers such as propylene glycol methyl ether, propylene glycol ethyl ether, propylene glycol-n-propyl ether and propylene glycol-n-butyl ether; propylene glycol alkyl ether acetates such as propylene glycol methyl ether acetate, propylene glycol ethyl ether acetate, propylene glycol-n-propyl ether acetate and propylene glycol-n-butyl ether acetate; propylene glycol alkyl ether propionates such as propylene glycol methyl ether propionate, propylene glycol ethyl ether propionate, propylene glycol-n-propyl ether propionate and propylene glycol-n-butyl ether propionate; aromatic hydrocarbons such as toluene and xylene; ketones such as methyl ethyl ketone, cyclohexanone and 4-hydroxy-4-methyl-2-pentanone; and other esters such as methyl acetate, ethyl acetate, n-propyl acetate, n-butyl acetate, methyl hydroxyacetate, ethyl hydroxyacetate, n-propyl hydroxyacetate, n-butyl hydroxyacetate, methyl lactate, ethyl lactate, n-propyl lactate, n-butyl lactate, methyl 3-hydroxypropionate, ethyl 3-hydroxypropionate, n-propyl 3-hydroxypropionate, n-butyl 3-hydroxypropionate, methyl 2-hydroxy-2-methylpropionate, ethyl 2-hydroxy-2-methylpropionate, methyl 2-hydroxy-3-methylbutanoate, methyl methoxyacetate, ethyl methoxyacetate, n-propyl methoxyacetate, n-butyl methoxyacetate, methyl ethoxyacetate, ethyl ethoxyacetate, n-propyl ethoxyacetate, n-butyl ethoxyacetate, methyl n-propoxyacetate, ethyl n-propoxyacetate, n-propyl n-propoxyacetate, n-butyl n-propoxyacetate, methyl n-butoxyacetate, ethyl n-butoxyacetate, n-propyl n-butoxyacetate, n-butyl n-butoxyacetate, methyl 2-methoxypropionate, ethyl 2-methoxypropionate, n-propyl 2-methoxypropionate, n-butyl 2-methoxypropionate, methyl 2-ethoxypropionate, ethyl 2-ethoxypropionate, n-propyl 2-ethoxypropionate, n-butyl 2-ethoxypropionate, methyl 2-n-propoxypropionate, ethyl 2-n-propoxypropionate, n-propyl 2-n-propoxypropionate, n-butyl 2-n-propoxypropionate, methyl 2-n-butoxypropionate, ethyl 2-n-butoxypropionate, n-propyl 2-n-butoxypropionate, n-butyl 2-n-butoxypropionate, methyl 3-methoxypropionate, ethyl 3-methoxypropionate, n-propyl 3-methoxypropionate, n-butyl 3-methoxypropionate, methyl 3-ethoxypropionate, ethyl 3-ethoxypropionate, n-propyl 3-ethoxypropionate, n-butyl 3-ethoxypropionate, methyl 3-n-propoxypropionate, ethyl 3-n-propoxypropionate, n-propyl 3-n-propoxypropionate, n-butyl 3-n-propoxypropionate, methyl 3-n-butoxypropionate, ethyl 3-n-butoxypropionate, n-propyl 3-n-butoxypropionate and n-butyl 3-n-butoxypropionate.

The above solvents may be used alone or in combination of two or more.

The amount of the solvent is preferably 100 to 450 parts by weight, more preferably 150 to 400 parts by weight based on 100 parts by weight of the total of the components (a1) to (a3).

As the polymerization initiator used for the manufacture of the copolymer [A] may be used what is generally known as a radical polymerization initiator. Examples of the polymerization initiator include azo compounds such as 2,2'-azobisisobutyronitrile, 2,2'-azobis-(2,4-dimethylvaleronitrile), 2,2'-azobis-(4-methoxy-2,4-dimethylvaleronitrile), 4,4'-azobis(4-cyanovalerianic acid), dimethyl 2,2'-azobis(2-methylpropionate) and 2,2'-azobis(4-methoxy-2,4-dimethylvaleronitrile); organic peroxides such as benzoyl peroxide, lauroyl peroxide, t-butylperoxypyvarate and 1,1-bis(t-butylperoxy)cyclohexane; and hydrogen peroxide. When a peroxide is used as the radical polymerization initiator, it may be used in combination with a reducing agent as a redox initiator.

These radical polymerization initiators may be used alone or in combination of two or more.

The amount of the radical polymerization initiator is preferably 0.5 to 50 parts by weight, more preferably 1.5 to 40 parts by weight based on 100 parts by weight of the total of the components (a1) to (a3).

A surfactant and a chain transfer agent may be used for radical polymerization.

As for radical polymerization conditions, the temperature is preferably 50 to 120° C., more preferably 60 to 110° C. and the polymerization time is preferably 60 to 540 minutes, more preferably 180 to 420 minutes.

The copolymer [A] obtained as described above has a weight average molecular weight in terms of polystyrene measured by gel permeation chromatography (GPC) (to be referred to as "Mw" hereinafter) of preferably $2 \times 10^3$ to $5 \times 10^5$, more preferably $5 \times 10^3$ to $1 \times 10^5$. When Mw of the copolymer [A] is lower than $2 \times 10^3$, the heat resistance of the obtained protective film may lower and when Mw is higher than $5 \times 10^5$, developability may degrade.

In the present invention, the copolymers [A] may be used alone or in combination of two or more.

The molecular weight of the copolymer [A] can be adjusted by the amount of the solvent and the amount of the radical polymerization initiator based on the total amount of the components (a1) to (a3), polymerization time, polymerization temperature and the use of a chain transfer agent.

[B] Monofunctional Polymerizable Unsaturated Compound Having a Molecular Weight of 180 or More and a Carboxyl Group Examples of the monofunctional polymerizable unsaturated compound having a molecular weight of 180 or more and a carboxyl group in the radiation sensitive resin composition of the present invention include 2-acryloyloxyethyl-succinic acid, 2-methacryloyloxyethyl-succinic acid, 2-acryloyloxyethylhexahydrosuccinic acid, 2-methacryloyloxyethylhexahydrosuccinic acid, 2-acryloyloxyethylphthalic acid, 2-methacryloyloxyethylphthalic acid, ω-carboxypolycaprolactone monoacrylate and ω-carboxypolycaprolactone monomethacrylate.

When the above monofunctional polymerizable unsaturated compounds having a molecular weight of 180 or more and a carboxyl group are added in a suitable amount, they serve to improve the storage stability and developability of the radiation sensitive resin composition and may be used alone or in combination of two or more.

In the radiation sensitive resin composition, the amount of the monofunctional polymerizable unsaturated compound having a molecular weight of 180 or more and a carboxyl group [B] is preferably 1 to 50 parts by weight, more preferably 3 to 40 parts by weight based on 100 parts by weight of the copolymer [A].

When the amount of the monofunctional polymerizable unsaturated compound having a molecular weight of 180 or more and a carboxyl group is smaller than 1 part by weight, its effect of improving developability is not obtained and when the amount is larger than 50 parts by weight, the thickness of a cured film after the post-baking of the obtained protective film may decrease.

[C] Polyfunctional Polymerizable Unsaturated Compound

In the radiation sensitive resin composition of the present invention, the polyfunctional polymerizable unsaturated compound [C] serves to improve the film residual rate and curability.

The polyfunctional polymerizable unsaturated compound [C] in the radiation sensitive resin composition of the present invention is preferably an acrylate or methacrylate having two or more functional groups (to be referred to as "(meth)acrylate" hereinafter).

Examples of the bifunctional (meth)acrylate include ethylene glycol diacrylate, ethylene glycol dimethacrylate, diethylene glycol diacrylate, diethylene glycol dimethacrylate, tetraethylene glycol diacrylate, tetraethylene glycol dimethacrylate, 1,6-hexanediol diacrylate, 1,6-hexanediol dimethacrylate, 1,9-nonanediol diacrylate, 1,9-nonanediol dimethacrylate, bisphenoxyethanolfluorene diacrylate and bisphenoxyethanolfluorene dimethacrylate. Commercially available products of the above bifunctional (meth)acrylates include Aronix M-210, M-240 and M-6200 (of Toagosei Chemical Industry Co., Ltd.), KAYARAD HDDA, HX-220 and R-604 (of Nippon Kayaku Co., Ltd., and Biscoat 260, 312 and 335HP (of Osaka Organic Chemical Industry, Ltd.).

Examples of the (meth)acrylate having 3 or more functional groups include trimethylolpropane triacrylate, trimethylolpropane trimethacrylate, pentaerythritol triacrylate, pentaerythritol trimethacrylate, pentaerythritol tetraacrylate, pentaerythritol tetramethacrylate, dipentaerythritol pentaacrylate, dipentaerythritol pentamethacrylate, dipentaerythritol hexaacrylate, dipentaerythritol hexamethacrylate, tri(2-acryloyloxyethyl)phosphate and tri(2-methacryloyloxyethyl)phosphate.

Examples of the (meth)acrylate having 9 or more functional groups include urethane acrylate compounds having an alkylene linear and alicyclic structures and obtained by reacting a compound having 2 or more isocyanate groups with a trifunctional, tetrafunctional or pentafunctional (meth)acrylate compound having 1 or more hydroxyl groups in the molecule.

Commercially available products of the above (meth)acrylates having 3 or more functional groups include Aronix M-309, M-400, M-405, M-450, M-7100, M-8030, M-8060 and TO-1450 (of Toagosei Chemical Industry Co., Ltd.), KAYARAD TMPTA, DPHA, DPCA-20, DPCA-30, DPCA-60 and DPCA-120 (of Nippon Kayaku Co., Ltd.), and Biscoat 295, 300, 360, GPT, 3PA and 400 (of Osaka Organic Chemical Industry, Ltd.). Commercially available products of the polyfunctional urethane acrylates having 9 or more functional groups include New Frontier R-1150 (of Dai-Ichi Kogyo Seiyaku Co., Ltd.) and KAYARAD DPHA-40H (of Nippon Kayaku Co., Ltd.).

Out of these (meth)acrylates having 2, 3 or more functional groups, (meth)acrylates having 3 or more functional groups are more preferred, and trimethylolpropane triacrylate, pentaerythritol triacrylate, pentaerythritol tetraacrylate, dipentaerythritol pentaacrylate and dipentaerythritol hexaacrylate are particularly preferred.

The above (meth)acrylates having 2, 3 or more functional groups may be used alone or in combination of two or more.

In the radiation sensitive resin composition, the amount of the polyfunctional polymerizable unsaturated compound [C] is preferably 50 to 200 parts by weight, more preferably 60 to 150 parts by weight based on 100 parts by weight of the copolymer [A]. When the amount of the polyfunctional polymerizable unsaturated compound [C] is smaller than 50 parts by weight, the development residue may be produced at the time of development and when the amount is larger than 200 parts by weight, the adhesion of the obtained protective film may lower.

The amounts of the monofunctional polymerizable unsaturated compound having a molecular weight of 180 or more and a carboxyl group [B] and the polyfunctional polymerizable unsaturated compound [C] may be used in any amounts within the above ranges.

[D] Photopolymerization Initiator

The photopolymerization initiator [D] in the radiation sensitive resin composition comprises a component which forms active species capable of initiating the polymerization of a polymerizable unsaturated compound upon exposure to radiation such as visible radiation, ultraviolet radiation, far ultraviolet radiation, charged particle radiation or X radiation. The photopolymerization initiator [D] is, for example, an acetophenone compound, biimidazole compound, benzoin compound, benzophenone compound, α-diketone compound or radiation sensitive cationic polymerization initiator such as onium salt or metallocene compound. Out of these, acetophenone compound and biimidazole compound are preferred.

The above acetophenone compound is, for example, a α-hydroxyketone compound, α-aminoketone compound or other compound.

Examples of the above α-hydroxyketone compound include 1-phenyl-2-hydroxy-2-methylpropan-1-one, 1-(4-1-propylphenyl)-2-hydroxy-2-methylpropan-1-one, 4-(2-hydroxyethoxy)phenyl-(2-hydroxy-2-propyl)ketone and 1-hydroxycyclohexylphenyl ketone. Examples of the above α-aminoketone compound include 2-methyl-1-[4-(methylthio)phenyl]-2-morpholinopropan-1-one and 2-benzyl-2-dimethylamino-1-(4-morpholinophenyl)-butan-1-one. These acetophenone compounds may be used alone or in combination of two or more.

In the present invention, the sensitivity of the obtained protective film can be improved by using an acetophenone compound.

Examples of the above biimidazole compound include 2,2'-bis(2-chlorophenyl)-4,4',5,5'-tetrakis(4-ethoxycarbonylphenyl)-1,2'-biimidazole, 2,2'-bis(2-bromophenyl)-4,4',5, 5'-tetrakis(4-ethoxycarbonylphenyl)-1,2'-biimidazole, 2,2'-bis(2-chlorophenyl)-4,4',5,5'-tetraphenyl-1,2'-biimidazole, 2,2'-bis(2,4-dichlorophenyl)-4,4',5,5'-tetraphenyl-1,2'-biimidazole, 2,2'-bis(2,4,6-trichlorophenyl)-4,4',5,5'-tetraphenyl-1,2'-biimidazole, 2,2'-bis(2-bromophenyl)-4,4',5,5'-tetraphenyl-1,2'-biimidazole, 2,2'-bis(2,4-dibromophenyl)-4,4', 5,5'-tetraphenyl-1,2'-biimidazole and 2,2'-bis(2,4,6-tribromophenyl)-4,4',5,5'-tetraphenyl-1,2 '-biimidazole.

Out of the above biimidazole compounds, 2,2'-bis(2-chlorophenyl)-4,4',5,5'-tetraphenyl-1,2'-biimidazole, 2,2'-bis(2, 4-dichlorophenyl)-4,4',5,5'-tetraphenyl-1,2'-biimidazole and 2,2'-bis(2,4,6-trichlorophenyl)-4,4',5,5'-tetraphenyl-1,2'-biimidazole are preferred, and 2,2'-bis(2,4-dichlorophenyl)-4, 4',5,5'-tetraphenyl-1,2'-biimidazole is particularly preferred.

The above biimidazole compounds may be used alone or in combination of two or more.

Sensitivity, resolution and adhesion can be further improved by using these biimidazole compounds.

When the biimidazole compound is used, an aromatic compound having a dialkylamino group (to be referred to as "dialkylamino group-containing sensitizer" hereinafter) may be used to improve the sensitivity of the biimidazole compound.

Examples of the dialkylamino group-containing sensitizer include 4,4'-bis(dimethylamino)benzophenone, 4,4'-bis(diethylamino)benzophenone, ethyl p-dimethylaminobenzoate, ethyl p-diethylaminobenzoate, i-amyl p-dimethylaminobenzoate and i-amyl p-diethylaminobenzoate.

Out of these dialkylamino group-containing sensitizers, 4,4'-bis(diethylamino)benzophenone is preferred.

The above dialkylamino group-containing sensitizers may be used alone or in combination of two or more.

The amount of the dialkylamino group-containing sensitizer is preferably 0.1 to 50 parts by weight, more preferably 1 to 20 parts by weight based on 100 parts by weight of the copolymer [A]. When the amount of the dialkylamino group-containing sensitizer is smaller than 0.1 part by weight, the thickness of the obtained protective film may decrease or the pattern shape may be impaired. When the amount is larger than 50 parts by weight, the pattern shape of the protective film may be impaired.

Further, when the biimidazole compound and the dialkylamino group-containing sensitizer are used in combination, a thiol compound may be added as a hydrogen donor. The sensitivity of the biimidazole compound is improved by the dialkylamino group-containing sensitizer to be cleaved, thereby forming an imidazole radical. It cannot be said that high polymerization initiation ability is always obtained, and the pattern edge of the obtained protective film is apt to have an unfavorable shape such as a reversely tapered shape. This problem can be eased by adding a thiol compound to a system where both the biimidazole compound and the dialkylamino group-containing sensitizer are existent. That is, a hydrogen radical is provided to an imidazole radical from the thiol compound to become a neutral imidazole, thereby forming a component having a sulfur radical with high polymerization initiation ability to provide a protective film having a more preferred pattern edge.

Examples of the above thiol compound include aromatic thiols such as 2-mercaptobenzothiazole, 2-mercaptobenzoxazole, 2-mercaptobenzimidazole, 2-mercapto-5-methoxybenzothiazole and 2-mercapto-5-methoxybenzimidazole, and aliphatic monothiols such as 3-mercaptopropionic acid, methyl 3-mercaptopropionate, ethyl 3-mercaptopropionate and octyl 3-mercaptopropionate. Examples of the aliphatic thiol having 2 or more functional groups include 3,6-dioxa-1,8-octanedithiol, pentaerythritol tetra(mercaptoacetate) and pentaerythritol tetra(3-mercaptopropionate).

These thiol compounds may be used alone or in combination of two or more.

The amount of the thiol compound is preferably 0.1 to 50 parts by weight, more preferably 1 to 20 parts by weight based on 100 parts by weight of the copolymer [A]. When the amount of the thiol compound is smaller than 0.1 part by weight, the thickness of the obtained protective film may decrease and when the amount is larger than 50 parts by weight, an unclear pattern edge (trailing edge) may be obtained.

The above photopolymerization initiators [D] may be used alone or in combination of two or more.

In the radiation sensitive resin composition, the amount of the photopolymerization initiator [D] is preferably 100 or less parts by weight, more preferably 0.1 to 80 parts by weight, particularly preferably 1 to 60 parts by weight based on 100 parts by weight of the copolymer [A]. When the amount of the photopolymerization initiator is larger than 100 parts by weight, the desired effect of the present invention may be impaired.

Other Additives

The radiation sensitive resin composition may be optionally mixed with additives other than the above components in limits that the desired effect of the present invention is not impaired.

For example, a surfactant may be mixed to improve coatability. The surfactant is preferably a fluorine surfactant or a silicone surfactant.

The fluorine surfactant is preferably a compound having a fluoroalkyl or fluoroalkylene group at one of a terminal, main chain and side chain. Examples of the fluorine surfactant include 1,1,2,2-tetrafluorooctyl(1,1,2,2-tetrafluoropropyl)ether, 1,1,2,2-tetrafluorooctylhexyl ether, octaethylene glycol di(1,1,2,2-tetrafluorobutyl)ether, hexaethylene glycol (1,1,2,2,3,3-hexafluoropentyl)ether, octapropylene glycol di(1,1,2,2,-tetrafluorobutyl)ether, hexapropylene glycol di(1,1,2,2,3,3-hexafluoropentyl)ether, sodium perfluorododecyl sulfonate, 1,1,2,2,8,8,9,9,10,10-decafluorododecane, 1,1,2,2,3,3-hexafluorodecane, sodium fluoroalkylbenzene sulfonate, sodium fluoroalkyl phosphonate, sodium fluoroalkyl carboxylate, fluoroalkylpolyoxyethylene ether, diglycerin tetrakis(fluoroalkylpolyoxyethylene ether), fluoroalkylammonium iodide, fluoroalkylbetain, fluoroalkylpolyoxyethylene ether, perfluoroalkylpolyoxyethanol, perfluoroalkyl alkoxylate and fluoroalkyl ester.

Commercially available products of the fluorine surfactant include BM-1000 and BM-1100 (of BM CHEMIE Co., Ltd.), Megafac F142D, F172, F173, F183, F178, F191, F471 and F476 (of Dainippon Ink and Chemicals Inc.), Florade FC 170C, FC-171, FC-430 and FC-431 (of Sumitomo 3M Limited), Surflon S-112, S-113, S-131, S-141, S-145, S-382, SC-101, SC-102, SC-103, SC-104, SC-105 and SC-106 (of Asahi Glass Co., Ltd.), F Top EF301, 303 and 352 (of Shih Akita Kasei Co., Ltd.), Futargent FT-100, FT-110, FT-140A, FT-150, FT-250, FT-251, FTX-251, FTX-218, FT-300, FT-310 and FT-400S (of NEOS Co., Ltd.).

Commercially available products of the silicone surfactant include Toray Silicon DC3PA, DC7PA, SH11PA, SH21PA, SH28PA, SH29PA, SH30PA, SH-190, SH-193, SZ-6032, SF-8428, DC-57 and DC-190 (of Toray Dow Corning Silicone Co., Ltd.), and TSF-4440, TSF-4300, TSF-4445, TSF-4446, TSF-4460 and TSF-4452 (of GE Toshiba Silicone Co., Ltd.).

Other surfactants include nonionic surfactants such as polyoxyethylene alkyl ethers including polyoxyethylene lauryl ether, polyoxyethylene stearyl ether and polyoxyethylene oleyl ether; polyoxyethylene aryl ethers including polyoxyethylene n-octylphenyl ether and polyoxyethylene n-nonylphenyl ether; polyoxyethylene dialkyl esters including polyoxyethylene dilaurate and polyoxyethylene distearate; and commercially available products including KP341 (of Shi-Etsu Chemical Co., Ltd.) and Polyflow Nos. 57 and 95 (of Kyoeisya Chemical Co., Ltd.).

These surfactants may be used alone or in combination of two or more.

The amount of the surfactant is preferably 5 parts or less by weight, more preferably 2 parts or less by weight based on 100 parts by weight of the copolymer [A]. When the amount of the surfactant is larger than 5 parts by weight, the film may be roughened at the time of coating.

To further improve adhesion to a substrate, an adhesion aid may be used.

The above adhesion aid is preferably a functional silane coupling agent such as a silane coupling agent having a reactive functional group such as a carboxyl group, methacryloyl group, isocyanate group or epoxy group. Examples of the adhesion aid include trimethoxysilylbenzoic acid, γ-methacryloyloxypropyl trimethoxysilane, vinyltriacetoxysilane, vinyltrimethoxysilane, γ-isocyanatopropyl triethoxysilane, γ-glycidoxypropyl trimethoxysilane and 2-(3,4-epoxycyclohexyl)ethyltrimethoxysilane.

These adhesive aids may be used alone or in combination of two or more.

The amount of the adhesion aid is preferably 20 parts or less by weight, more preferably 10 parts or less by weight based on 100 parts by weight of the copolymer [A]. When the amount of the adhesion aid is larger than 20 parts by weight, the development residue may be produced.

Other additives are added to the radiation sensitive resin composition of the present invention to improve its storage stability. The additives include sulfur, quinone, hydroquinone, polyoxy compound, amine and nitronitroso compound. Examples of the additives include 4-methoxyphenol and N-nitroso-N-phenylhydroxylamine aluminum. The amount of these compounds is preferably 3.0 parts or less by weight, more preferably 0.001 to 0.5 part by weight based on 100 parts by weight of the polymer [A]. When the amount is larger than 3.0 parts by weight, sufficiently high sensitivity cannot be obtained and the pattern shape becomes worse.

An N-(alkoxymethyl)glycoluril compound, an N-(alkoxymethyl)melamine compound and a compound having an epoxy group in one molecule and two or more functional groups may be added to improve heat resistance. Examples of the above N-(alkoxymethyl)glycoluril compound include N,N,N',N'-tetra(methoxymethyl)glycoluril, N,N,N',N'-tetra(ethoxymethyl)glycoluril, N,N,N',N'-tetra(n-propoxymethyl)glycoluril, N,N,N',N'-tetra(i-propoxymethyl)glycoluril, N,N,N',N'-tetra(n-butoxymethyl)glycoluril and N,N,N',N'-tetra(t-butoxymethyl)glycoluril. Out of these, N,N,N',N'-tetra(methoxymethyl)glycoluril is particularly preferred. Examples of the above N-(alkoxymethyl) melamine compound include N,N,N',N',N'', N'''-hexa(methoxymethyl)melamine, N,N,N',N',N'', N'''-hexa(ethoxymethyl)melamine, N,N,N',N',N'', N'''-hexa(n-propoxymethyl) melamine, N,N,N',N',N'', N'''-hexa(1-propoxymethyl) melamine, N,N,N',N',N'', N'''-hexa(n-butoxymethyl) melamine and N,N,N',N',N'', N'''-hexa(t-butoxymethyl) melamine. Out of these, N,N,N',N', N'',N'''-hexa (methoxymethyl)melamine is particularly preferred. Commercially available products of these compounds include Nicalak N-2702 and MW-30M (of Sanwa Chemical Co., Ltd.).

Examples of the compound having an epoxy group in one molecule and 2 or more functional groups include ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerin diglycidyl ether, trimethylolpropane triglycidyl ether, hydrogenated bisphenol A diglycidyl ether and bisphenol A diglycidyl ether. Commercially available products of these compounds include Epolite 40E, Epolite 100E, Epolite 200E, Epolite 70P, Epolite 200P, Epolite 400P, Epolite 40E, Epolite 1500NP, Epolite 1600, Epolite 80MF, Epolite 100MF, Epolite 4000 and Epolite 3002 (of Kyoeisya Chemical Co., Ltd.). They may be used alone or in combination of two or more.

Composition Solution

The radiation sensitive resin composition is prepared as a composition solution by dissolving the copolymer [A], the monofunctional polymerizable unsaturated compound having a molecular weight of 180 or more and a carboxyl group [B], the polyfunctional polymerizable unsaturated compound (C) and the photopolymerization initiator [D] in a suitable solvent.

The solvent used to prepare the above composition solution is a solvent which dissolves the components constituting the radiation sensitive resin composition uniformly and does not react with these components.

Examples of the solvent are the same as those listed for the solvent which can be used to manufacture the above copolymer [A].

Out of these solvents, alcohols, glycol ethers, ethylene glycol alkylether acetates, esters and diethylene glycols are preferred from the viewpoints of the solubility of the above components, reactivity with these components and the easy formation of a coating film. Out of these, benzyl alcohol, 2-phenylethyl alcohol, 3-phenyl-1-propanol, ethylene glycol monobutyl ether acetate, diethylene glycol monoethyl ether acetate, diethylene glycol diethyl ether, diethylene glycol ethyl methyl ether, diethylene glycol dimethyl ether, propylene glycol monomethyl ether, propylene glycol monomethyl ether acetate, methyl methoxypropionate, ethyl ethoxypropionate and 3-methoxybutyl acetate are particularly preferably used.

Further, a high-boiling point solvent may be used in combination with the above solvent to improve in-plane uniformity in film thickness. Examples of the high-boiling point solvent include N-methylformamide, N,N-dimethylformamide, N-methylformanilide, N-methylacetamide, N,N-dimethylacetamide, N-methylpyrrolidone, dimethyl sulfoxide, benzyl ethyl ether, dihexyl ether, acetonylacetone, isophorone, caproic acid, caprylic acid, 1-octanol, 1-nonanol, benzyl acetate, ethyl benzoate, diethyl oxalate, diethyl maleate, γ-butyrolactone, ethylene carbonate, propylene carbonate and phenyl cellosolve acetate. Out of these, N-methylpyrrolidone, γ-butyrolactone and N,N-dimethylacetamide are preferred.

The amount of the solvent is such that the solid content of the radiation sensitive resin composition of the present invention becomes preferably 1 to 50 wt %, more preferably 5 to 40 wt %.

The composition solution prepared as described above may be optionally filtered with a millipore filter having an opening diameter of about 0.2 to 0.5 µm before use.

The radiation sensitive resin composition is particularly suitable as a material for forming a radiation sensitive protective film for liquid crystal display devices and solid-state image sensing devices.

Formation of Radiation Sensitive Protective Film

The protective film of the present invention for liquid crystal display devices and solid-state image sensing devices can be formed by the following steps in the following order.

(1) the step of forming a coating film of the radiation sensitive resin composition for forming a protective film of the present invention on a substrate
(2) the step of exposing at least part of the coating film to radiation
(3) the step of developing the coating film after exposure
(4) the step of heating the coating film after development Each of the above steps will be described hereinbelow.

Step (1):

A transparent conductive film is formed on one side of a transparent substrate, and the radiation sensitive resin composition is applied to the transparent conductive film preferably as a composition solution and prebaked to form a coating film.

The transparent substrate is, for example, a glass substrate or resin substrate. Specific examples of the substrate include substrates made from glass such as soda lime glass and alkali-free glass; and resin substrates made from plastics such as polyethylene terephthalate, polybutylene terephthalate, polyether sulfone, polycarbonate and polyimide.

The transparent conductive film formed on one side of the transparent substrate is a NESA film (registered trademark of PPG Co., Ltd. of the U.S.) made from tin oxide ($SnO_2$) or an ITO film made from indium oxide-tin oxide ($In_2O_3$—$SnO_2$).

As means of applying the composition solution, a suitable coating technique such as spray coating, roll coating, rotational coating (spin coating), slit-die coating, bar coating or ink jet coating may be employed. Spin coating and slit-die coating are preferred.

As for prebaking conditions which differ according to the types and mixing ratio of the components, the coating film is preferably prebaked at 70 to 150° C. for about 1 to 15 minutes.

Step (2):

Thereafter, at least part of the formed coating film is exposed to radiation. A photomask having a predetermined pattern is generally used to expose part of the coating film.

The radiation used for exposure is selected from visible radiation, ultraviolet radiation, far ultraviolet radiation, electron radiation and X-radiation. Radiation having a wavelength of 190 to 450 nm is preferred, and radiation including ultraviolet rays having a wavelength of 365 nm is particularly preferred.

The dose of the radiation is preferably 100 to 10,000 J/m$^2$, more preferably 300 to 3,000 J/m$^2$ as a value obtained by measuring the intensity of the radiation at a wavelength of 365 nm with an illuminance meter (OAI model 356 of OAI Optical Associates Inc.).

Step (3):

Thereafter, the exposed coating film is developed to remove an unrequired portion so as to form a predetermined pattern.

The developer used for development is preferably an alkali developer. The alkali developer is, for example, an aqueous solution of an alkaline compound selected from inorganic alkalis such as sodium hydroxide, potassium hydroxide, sodium carbonate, sodium silicate, sodium metasilicate and ammonia; aliphatic primary amines such as ethylamine and n-propylamine; aliphatic secondary amines such as diethylamine and di-n-propylamine; aliphatic tertiary amines such as trimethylamine, methyldiethylamine, dimethylethylamine and triethylamine; alicyclic tertiary amines such as pyrrole, piperidine, N-methylpiperidine, N-methylpyrrolidine, 1,8-diazabicyclo[5.4.0]-7-undecene and 1,5-diazabicyclo[4.3.0]-5-nonene; aromatic tertiary amines such as pyridine, collidine, lutidine and quinoline; alkanol amines such as ethanoldimethylamine, methyl diethanolamine and triethanolamine; and quaternary ammonium salts such as tetramethylammonium hydroxide and tetraethylammonium hydroxide.

A suitable amount of a water-soluble organic solvent such as methanol or ethanol, or a surfactant may be added to the above aqueous solution of the alkaline compound.

Puddle development, dip development or shower development may be employed, and the development time is preferably about 10 to 180 seconds After development, the coating film is rinsed with running water for 30 to 90 seconds and dried with air such as compressed air or compressed nitrogen to form a desired pattern.

Step (4)

Then, the obtained pattern is post-baked at a predetermined temperature, for example, 150 to 250° C. with a heating device such as a hot plate or oven for a predetermined time, for example, 5 to 30 minutes on a hot plate and 15 to 120 minutes in an oven to obtain a predetermined protective film.

Liquid Crystal Display Device

The structure of the liquid crystal display device of the present invention is not particularly limited but, for example, a structure having a color filter layer and a spacer which are formed on a transparent substrate, two alignment films opposed to each other with a liquid crystal layer therebetween, opposed transparent electrodes and a transparent substrate opposed to the above transparent substrate. The protective film is formed on a polarizing plate or a color filter layer.

A TN-TFT type liquid crystal display device can be manufactured by forming a color filter layer and a spacer on a transparent substrate and opposing them to a thin film transistor (TFT) array with an alignment film and a liquid crystal layer therebetween. Also in this case, the protective film is formed on a polarizing plate or a color filter layer.

Solid-state Image Sensing Device

The solid-state image sensing device of the present invention comprises a substrate layer, a flattening layer which is the protective film of the present invention and a microlens. The flattening layer in the present invention includes (1) an entire protective film formed between a microlens and a color resist layer or a patterned color filter flattening layer, (2) a layer for covering a microlens (a light receiving flattening layer between microlenses), and (3) a layer formed between an anti-halation layer and a color resist layer (a light receiving flattening layer) (as for details of their structures, please refer to FIGS. 1 to 3 of JP-A 2006-199902).

As described above, according to the present invention, there is provided a radiation sensitive resin composition for forming a protective film, which has excellent flatness, heat resistance and developability at the time of patterning as a protective film for liquid crystal display devices and solid-state image sensing devices and high storage stability as a composition.

EXAMPLES

The following examples and comparative examples are provided for the purpose of further illustrating the present invention but are in no way to be taken as limiting.

Synthesis Example 1

7 parts by weight of 2,2'-azobis(2,4-dimethylvaleronitrile) and 200 parts by weight of propylene glycol monomethyl ether acetate were fed to a flask equipped with a cooling tube and a stirrer. Subsequently, 19 parts by weight of styrene, 38 parts by weight of tricyclo[5.2.1.0$^{2.6}$]decan-8-yl methacrylate, 13 parts by weight of methacrylic acid (MA) and 30 parts by weight of methyl glycidyl methacrylate were fed to the flask, the inside of the flask was substituted by nitrogen, and agitation was started gently. The temperature of the solution was raised to 70° C. and maintained at that temperature for 7 hours to obtain a polymer solution containing a copolymer (A-1). The solid content of the obtained polymer solution was 32.9 wt %.

The weight average molecular weight of the polymer was 15,000 (weight average molecular weight in terms of polystyrene measured by GPC (gel permeation chromatography) using the Shodex GPC-101 (of Showa Denko K.K.), the same shall apply hereinafter).

Synthesis Example 2

5 parts by weight of 2,2'-azobis(2,4-dimethylvaleronitrile) and 200 parts by weight of propylene glycol monomethyl ether acetate were fed to a flask equipped with a cooling tube and a stirrer. Subsequently, 40 parts by weight of glycidyl methacrylate, 40 parts by weight of 1-ethylcyclopentyl methacrylate, 10 parts by weight of methacrylic acid, 5 parts by weight of styrene and 5 parts by weight of N-cyclohexylmaleimide were fed to the flask, the inside of the flask was substituted by nitrogen, and agitation was started gently. The temperature of the solution was raised to 70° C. and maintained at that temperature for 5 hours to obtain a polymer solution containing a copolymer (A-2). The solid content of the obtained polymer solution was 32.8 wt %.

The weight average molecular weight of the polymer was 15,000.

Synthesis Example 3

5 parts by weight of 2,2'-azobis(2,4-dimethylvaleronitrile) and 270 parts by weight of diethylene glycol methyl ethyl ether were fed to a flask equipped with a cooling tube and a stirrer. Subsequently, 18 parts by weight of methacrylic acid, 45 parts by weight of glycidyl methacrylate, 25 parts by weight of styrene and 12 parts by weight of tricyclo

[5.2.1.0$^{2.6}$]decan-8-yl methacrylate were fed to the flask, the inside of the flask was substituted by nitrogen, and agitation was started gently. The temperature of the solution was raised to 70° C. and maintained at that temperature for 4 hours to obtain a resin solution containing a copolymer (A-3). The solid content of the obtained resin solution was 28.4 wt %.

The weight average molecular weight of the polymer was 14,000.

Synthesis Example 4

3 parts by weight of 2,2'-azobis(2,4-dimethylvaleronitrile) and 200 parts by weight of propylene glycol monomethyl ether acetate were fed to a flask equipped with a cooling tube and a stirrer. Subsequently, 15 parts by weight of methacrylic acid, 15 parts by weight of styrene, 35 parts by weight of benzyl methacrylate, 10 parts by weight of glycerol monomethacrylate, 25 parts by weight of N-phenylmaleimide and 2.5 parts by weight of α-methylstyrene dimer as a chain transfer agent were fed to the flask, the inside of the flask was substituted by nitrogen, and agitation was started gently. The temperature of the reaction solution was then raised to 80° C. and maintained at that temperature for 3 hours. Thereafter, the reaction solution was heated at 100° C., and 0.5 part by weight of 2,2'-azobis(2,4-dimethylvaleronitrile) was added to carry out polymerization for another 1 hour to obtain a polymer solution containing a copolymer (A-4). The solid content of the obtained polymer solution was 33.0 wt %.

The weight average molecular weight of the polymer was 15,000.

Example 1

Preparation of Composition Solution 100 parts by weight of the polymer solution obtained in Synthesis Example 1 in terms of the polymer [A-1] which is the component [A], 5 parts by weight of ω-carboxypolycaprolactone monoacrylate (Aronix M-5300 of Toagosei Chemical Industry Co., Ltd.) as the component [B], 100 parts by weight of dipentaerythritol hexaacrylate (KAYARAD DPHA of Nippon Kayaku Co., Ltd.) as the component [C], 30 parts by weight of 2-methyl-1-(4-methylthiophenyl)-2-morpholinopropan-1-one (Irgacure 907 of Ciba Specialty Chemicals Co., Ltd.) as the component [D], 10 parts by weight of γ-glycidoxypropyltrimethoxysilane as an adhesion aid, 0.05 part by weight of FTX-218 as a surfactant (manufactured by NEOS Co., Ltd.) and ?? as a storage stabilizer were dissolved in propylene glycol monomethyl ether acetate to ensure that the solid content of the obtained solution became 30 wt %, and the resulting solution was filtered by a millipore filter having an opening diameter of 0.5 μm to prepare a composition solution (S-1).

Examples 2 to 10 and Comparative Examples 1 to 4

Composition solutions (S-2) to (S-10) and (s-1) to (s-4) were prepared in the same manner as in Example 1 except that the types and amounts of the components [A], [B] and [C] were changed as shown in Table 1.

Formation of Protective Film

A coating film having a thickness of 1.2 μm was formed by applying each of the above composition solutions to an alkali-free glass substrate with a spinner and prebaking it on a hot plate at 80° C. for 3 minutes.

The obtained coating film was exposed to ultraviolet radiation having an intensity of 40 W/m$^2$ at 365 nm through a photomask for 2.5 seconds (1,000 J/m$^2$). Thereafter, the coating film was developed with a 0.05 wt % aqueous solution of tetramethylammonium hydride (TMAH), rinsed with pure water for 1 minute and heated in an oven at 220° C. for 30 minutes to form a protective film.

This protective film was evaluated by the following procedures. The evaluation results are shown in Table 2.

(1) Evaluation of Development Time

A protective film was formed in the same manner as the above protective film except that the development time was changed. The residue on an unexposed portion was observed through an optical microscope for each development time. When it was confirmed that no residue was existent on the unexposed portion, the time was taken as development time. It can be said that as the development time is shorter, developability becomes higher.

(2) Evaluation of Film Residual Rate

When the protective film was formed, the film residual rate after development (film thickness after development×100/initial film thickness) was obtained. It can be said that when the film residual rate at a dose of 1,000 J/m$^2$ is 90% or more, it is satisfactory.

(3) Measurement of Surface Hardness

The surface hardness of the protective film formed on the substrate as described above was measured by the 8.4.1 pencil scratching test of JIS K-5400-1990. This value is shown in Table 2. This value must be HB or more. It is more preferably 4H or more.

(4) Evaluation of Adhesion

A protective film was formed in the same manner as above except that a photomask was not used and evaluated by the 8.5.2 crosscut tape method out of 8.5 adhesion tests of JIS K-5400 (1900). The number of remaining squares out of 100 squares is shown in Table 2.

(5) Evaluation of Flatness

Pigment-based color resists (JCR RED 689, JCR GREEN 706 and CR 8200B of JSR Corporation) were applied to a glass wafer substrate with a spinner and prebaked on a hot plate at 90° C. for 150 seconds to form coating films. Thereafter, the coating films were exposed to a ghi line (intensity ratio of wavelengths 436 nm, 405 nm and 365 nm=2.7:2.5:4.8) at a dose of 2,000 J/m$^2$ in terms of an i line with the Canon PLA501F exposure machine (of Canon Corporation) through a predetermined pattern mask, developed with a 0.05 wt % aqueous solution of potassium hydroxide, rinsed with super pure water for 60 seconds and further heated in an oven at 220° C. for 30 minutes to form a red, green and blue striped color filter (stripe width of 100 μm).

When the surface unevenness of the substrate having this color filter was measured with the α-step surface roughness meter (of Tencal Co., Ltd.), it was 1.0 μm. At this point, the measurement length was 2,000 μm, the measurement range was 2,000 μm$^2$, and the number "n" of measurement points was 5. That is, the measurement directions were the short-axis direction of red, green and blue striped lines and the long-axis direction of the same red, green and blue striped lines, and the number "n" of measurement points was 5 in each direction (total number "n" was 10).

The above composition for forming a protective film was applied to this color filter with a spinner and prebaked on a hot plate at 90° C. for 5 minutes to form a coating film which was then heated in an oven at 220° C. for 60 minutes to form a protective film having a thickness of 2.0 μm from the top of the color filter. The term "film thickness" means the thickness from the top surface of the color filter formed on the substrate.

The surface unevenness of the substrate having the protective film on the color filter as described above was measured with the α-step contact type film thickness measuring instrument (of Tencal Japan Co., Ltd.). At this point, the measurement length was 2,000 μm, the measurement range was 2,000 μm², and the number "n" of measurement points was 5. That is, the measurement directions were the short-axis direction of red, green and blue striped lines and the long-axis direction of the same red, green and blue striped lines, and the number "n" of measurement points was 5 in each direction (total number "n" was 10). The mean value of 10 height differences (nm) between the highest portion and the lowest portion obtained by each measurement is shown in Table 2. It can be said that when this value is 300 nm or less, flatness is satisfactory.

(6) Evaluation of Viscosity Increase Rate

After a composition solution was prepared in the same manner as in Example 1, the viscosity of the composition solution was measured. After this solution was kept at 25° C. for 21 days, its viscosity was measured. The viscosity increase rate (%) was calculated from the following equation. The viscosity measurement temperature was 20° C. Viscosity increase rate (%)={(viscosity 10 days after preparation of composition solution)−(viscosity 0 day after preparation of composition solution)}/(viscosity 0 day after preparation of composition solution)×100

It can be said that when the viscosity increase rate after 10 days is 2% or less, storage stability is satisfactory.

(7) Evaluation of Film Thickness Increase Rate

After a composition solution was prepared in the same manner as in Example 1, the film thickness of the composition solution was measured. After the solution was kept at 25° C. for 21 days, the film thickness of the composition solution after 21 days was measured. The film thickness increase rate (%) was calculated from the following equation. Film thickness increase rate (%)={(film thickness 21 days after preparation of composition solution)−(film thickness 0 day after preparation of composition solution)}/(film thickness 0 day after preparation of composition solution)×100

It can be said that when the film thickness increase rate after 21 days is 2% or less, storage stability is satisfactory.

(8) Evaluation of Development Residue on Color Filter

Pigment-based color resists (JCR RED772D, JCR Blue849 and JCR GREEN856 of JSR Corporation) were applied to an alkali-free glass substrate with a spinner and prebaked on a hot plate at 90° C. for 60 seconds to form coating films having a thickness of 1.5 μm. Thereafter, the coating films were exposed to a ghi line (intensity ratio of wavelengths 436 nm, 405 nm and 365 nm=2.7:2.5:4.8) at a dose of 2,000 J/m² in terms of an i line with the Canon PLA501F exposure machine (of Canon Corporation) without using a pattern mask, developed with a 0.05 wt % aqueous solution of potassium hydroxide, rinsed with super pure water for 60 seconds and further heated in an oven at 220° C. for 20 minutes to form three substrates having red, green and blue coating films, respectively.

After the above composition solution for forming a protective film was applied to these substrates with a spinner, it was prebaked on a hot plate at 90° C. for 3 minutes to form a coating film having a thickness of 1.5 μm. Thereafter, it was exposed to ultraviolet radiation having an intensity of 40 W/m² at 365 nm for 5.0 seconds (2,000 J/m²) through a predetermined pattern mask. Thereafter, it was developed with a 0.05 wt % aqueous solution of tetramethylammonium hydride (TMAH) for 60 seconds and rinsed with super pure water for 60 seconds to form a 50 m² protective film pattern.

The peripheral portion of the protective film formed as described above was observed through an optical microscope. ○ in Table 2 means that the development residue was not seen and X means that the development residue was seen.

The abbreviations in Table 1 denote the following compounds.

Component [B]
B-1: ω-carboxypolycaprolactone monoacrylate (Aronix M-5300 of Toagosei Chemical Industry Co., Ltd.)
B-2: 2-acryloyloxyethyl-succinic acid (HOA-MS of Kyoei-sya Chemical Co., Ltd.)

Component [C]
C-1: dipentaerythritol hexaactylate (KAYARAD DPHA of Nippon Kayaku Co., Ltd.)

Component [D]
D-1: 2-methyl-1-(4-methylthiophenyl)-2-morpholinopropan-1-one (Irgacure 907 of Ciba Specialty Chemicals Co., Ltd.)
D-2: 2,2'-bis(2-chlorophenyl)-4,4',5,5'-tetraphenyl-1,2'-biimidazole
D-3: 4,4'-bis(diethylamino)benzophenone
D-4: 2-mercaptobenzothiazole The mark "-" in Table 1 means that the above component is not added.

The evaluation results are shown in Table 2.

TABLE 1

| | Composition solution | Component (A) Type | Component (A) Parts by weight | Component (B) Type | Component (B) Parts by weight | Component (C) Type | Component (C) Parts by weight | Component (D) Type | Component (D) Parts by weight |
|---|---|---|---|---|---|---|---|---|---|
| Ex. 1 | (S-1) | A-1 | 100 | B-1 | 5 | C-1 | 100 | D-1 | 30 |
| Ex. 2 | (S-2) | A-1 | 100 | B-2 | 5 | C-1 | 100 | D-1 | 30 |
| Ex. 3 | (S-3) | A-1 | 100 | B-1 | 5 | C-1 | 100 | D-1 + D-2 + D-3 + D-4 | 10 + 5 + 5 + 2.5 |
| Ex. 4 | (S-4) | A-1 + A-2 | 75 + 25 | B-1 | 5 | C-1 | 100 | D-1 | 30 |
| Ex. 5 | (S-5) | A-1 + A-2 | 50 + 50 | B-1 | 5 | C-1 | 100 | D-1 | 30 |
| Ex. 6 | (S-6) | A-1 + A-2 | 25 + 75 | B-1 | 5 | C-1 | 100 | D-1 | 30 |
| Ex. 7 | (S-7) | A-1 + A-2 | 50 + 50 | B-1 | 10 | C-1 | 100 | D-1 | 30 |
| Ex. 8 | (S-8) | A-3 | 100 | B-1 | 5 | C-1 | 100 | D-1 | 30 |
| Ex. 9 | (S-9) | A-3 | 100 | B-1 | 10 | C-1 | 100 | D-1 | 30 |

TABLE 1-continued

| | | Component (A) | | Component (B) | | Component (C) | | Component (D) | |
|---|---|---|---|---|---|---|---|---|---|
| | Composition solution | Type | Parts by weight | Type | Parts by weight | Type | Parts by weight | Type | Parts by weight |
| Ex. 10 | (S-10) | A-3 | 100 | B-1 | 5 | C-1 | 100 | D-1 + D-2 + D-3 + D-4 | 10 + 5 + 5 + 2.5 |
| C. Ex. 1 | (s-1) | A-1 | 100 | B-1 | 0 | C-1 | 100 | D-1 | 30 |
| C. Ex. 2 | (s-2) | A-1 + A-2 | 50 + 50 | B-1 | 0 | C-1 | 100 | D-1 | 30 |
| C. Ex. 3 | (s-3) | A-3 | 100 | B-1 | 0 | C-1 | 100 | D-1 | 30 |
| C. Ex. 4 | (s-4) | A-4 | 100 | B-1 | 0 | C-1 | 100 | D-1 | 30 |

Ex.: Example
C. Ex.: Comparative Example

TABLE 2

| | Type of composition | Development time (sec) | Film residual rate (%) | Surface hardness - | Adhesion (/100) | Flatness (nm) | Viscosity increase rate (%) | Film thickness increase rate (%) | development residue on color filter | | |
|---|---|---|---|---|---|---|---|---|---|---|---|
| | | | | | | | | | On red coating film | on blue coating film | on green coating film |
| Ex. 1 | (S-1) | 60 | 91 | 4H | 100 | 190 | 0.2 | 0.2 | ○ | ○ | ○ |
| Ex. 2 | (S-2) | 60 | 91 | 4H | 100 | 220 | 1.1 | 0.4 | ○ | ○ | ○ |
| Ex. 3 | (S-3) | 60 | 92 | 4H | 100 | 190 | 0.2 | 0.0 | ○ | ○ | ○ |
| Ex. 4 | (S-4) | 60 | 94 | 5H | 100 | 180 | 0.2 | 0.1 | ○ | ○ | ○ |
| Ex. 5 | (S-5) | 65 | 95 | 6H | 100 | 170 | 0.1 | 0.1 | ○ | ○ | ○ |
| Ex. 6 | (S-6) | 70 | 95 | 7H | 100 | 160 | 0.0 | 0.0 | ○ | ○ | ○ |
| Ex. 7 | (S-7) | 60 | 94 | 6H | 100 | 170 | 0.1 | 0.0 | ○ | ○ | ○ |
| Ex. 8 | (S-8) | 55 | 91 | 4H | 100 | 210 | 2.0 | 0.5 | ○ | ○ | ○ |
| Ex. 9 | (S-9) | 50 | 90 | 4H | 100 | 200 | 1.9 | 0.4 | ○ | ○ | ○ |
| Ex. 10 | (S-10) | 55 | 92 | 4H | 100 | 210 | 2.0 | 0.5 | ○ | ○ | ○ |
| C. Ex. 1 | (s-1) | 65 | 89 | 4H | 100 | 280 | 1.9 | 0.7 | X | X | X |
| C. Ex. 2 | (s-2) | 70 | 90 | 4H | 100 | 260 | 1.4 | 0.6 | X | X | X |
| C. Ex. 3 | (s-3) | 60 | 90 | 4H | 100 | 310 | 4.6 | 1.1 | ○ | ○ | ○ |
| C. Ex. 4 | (s-4) | 50 | 84 | 3H | 90 | 380 | 1.1 | 0.2 | ○ | ○ | ○ |

Ex.: Example
C. Ex.: Comparative Example

Since the radiation sensitive resin composition for forming a protective film of the present invention can provide a cured film having high flatness and has high developability and heat resistance, it is advantageously used to form a protective film for liquid crystal display devices and solid-state image sensing devices and further useful for spacers for liquid crystal display devices.

What is claimed is:

1. A radiation sensitive resin composition for forming a protective film, comprising:
   [A] a copolymer of (a1) an unsaturated carboxylic acid, an unsaturated carboxylic anhydride or a mixture of an unsaturated carboxylic acid and an unsaturated carboxylic anhydride, (a2) an epoxy group-containing unsaturated compound and (a3) an unsaturated compound different from the components (a1) and (a2);
   [B] a monofunctional polymerizable unsaturated compound having a carboxyl group and a molecular weight of 180 or more;
   [C] a polyfunctional polymerizable unsaturated compound; and
   [D] a photopolymerization initiator.

2. The radiation sensitive resin composition according to claim 1, wherein the component (a3) of the copolymer [A] comprises at least one unsaturated compound selected from the group consisting of a polymerizable unsaturated compound having at least one structure selected from the group consisting of the acetal ester structure of carboxylic acid, the ketal ester structure of carboxylic acid, the t-butyl ester structure of carboxylic acid and the 1-alkylcycloalkyl ester structure of carboxylic acid, alkyl acrylate, alkyl methacrylate, alicyclic acrylate, alicyclic methacrylate, aryl acrylate, aryl methacrylate, dialkyl dicarboxylate, hydroxyalkyl acrylate, hydroxyalkyl methacrylate, aromatic vinyl compound, acrylonitrile, methacrylonitrile, acrylamide, methacrylamide, vinyl acetate, 1,3-butadiene, isoprene, 2,3-dimethyl-1,3-butadiene, N-cyclohexylmaleimide, N-phenylmaleimide, N-benzylmaleimide, N-succinimidyl-3-maleimide benzoate, N-succinimidyl-4-maleimide butyrate, N-succinimidyl-6-maleimide caproate, N-succinimidyl-3-maleimide propionate and N-(9-acridinyl)maleimide.

3. The radiation sensitive resin composition according to claim 1, wherein the component (a3) of the copolymer [A] comprises a polymerizable unsaturated compound having at least one structure selected from the group consisting of the acetal ester structure of carboxylic acid, the ketal ester structure of carboxylic acid, the t-butyl ester structure of carboxylic acid and the 1-alkylcycloalkyl ester structure of carboxylic acid.

4. A protective film formed from the radiation sensitive resin composition of any one of claim 1 to 3.

5. A method of forming a protective film for liquid crystal display devices or solid-state image sensing devices, comprising at least the following steps in the following mentioned order:

(1) forming a coating film of the radiation sensitive resin composition of claim 1 or 2 on a substrate;

(2) exposing at least part of the coating film to radiation;

(3) developing the coating film after exposure; and (4) heating the coating film after development.

6. A liquid crystal display device or solid-state image sensing device having the protective film of claim 4.

* * * * *